United States Patent [19]

Bloch et al.

[11] Patent Number: 4,467,568
[45] Date of Patent: Aug. 28, 1984

[54] GENERATING METHOD FOR THE CHIP-PRODUCING MACHINING OF INVOLUTE TOOTH FLANKS WITH PROFILE AND LONGITUDINAL CORRECTIONS

[75] Inventors: Peter Bloch, Mutschellen; Robert Wydler, Zurich; Erwin J. Gunter, Widen, all of Switzerland

[73] Assignee: Maag Gear-Wheel & Machine Co. Ltd., Zurich, Switzerland

[21] Appl. No.: 415,360

[22] Filed: Sep. 7, 1982

[30] Foreign Application Priority Data

Sep. 14, 1981 [CH] Switzerland .................. 5921/81

[51] Int. Cl.$^3$ .............................................. B24B 1/00
[52] U.S. Cl. .................................. 51/287; 51/52 R; 51/95 GH
[58] Field of Search ............... 51/287, 52 R, 95 GH

[56] References Cited

U.S. PATENT DOCUMENTS

| 3,044,221 | 7/1962 | Graf ................................. 51/123 G |
| 4,400,916 | 8/1983 | Bloch et al. ........................ 51/287 |
| 4,423,570 | 1/1984 | Bartosek ......................... 51/165.88 |

Primary Examiner—Frederick R. Schmidt
Assistant Examiner—Daschel Matthew D.
Attorney, Agent, or Firm—Werner W. Kleeman

[57] ABSTRACT

The generating method is accomplished at a machine containing one or two tools, constructed to possess a disk, cone or double-cone configuration, which are moved to-and-fro in a stroke-like fashion along the tooth flanks and can be advanced in the direction of the tooth flanks and act at one or two work locations upon a respective tooth flank. The displacement of the tool or each tool needed for producing the profile and longitudinal corrections is determined for each work location at the field of action or engagement zone of the teeth and is controlled as a function of the generating position and the stroke position of the machine tools according to predetermined functions.

5 Claims, 15 Drawing Figures

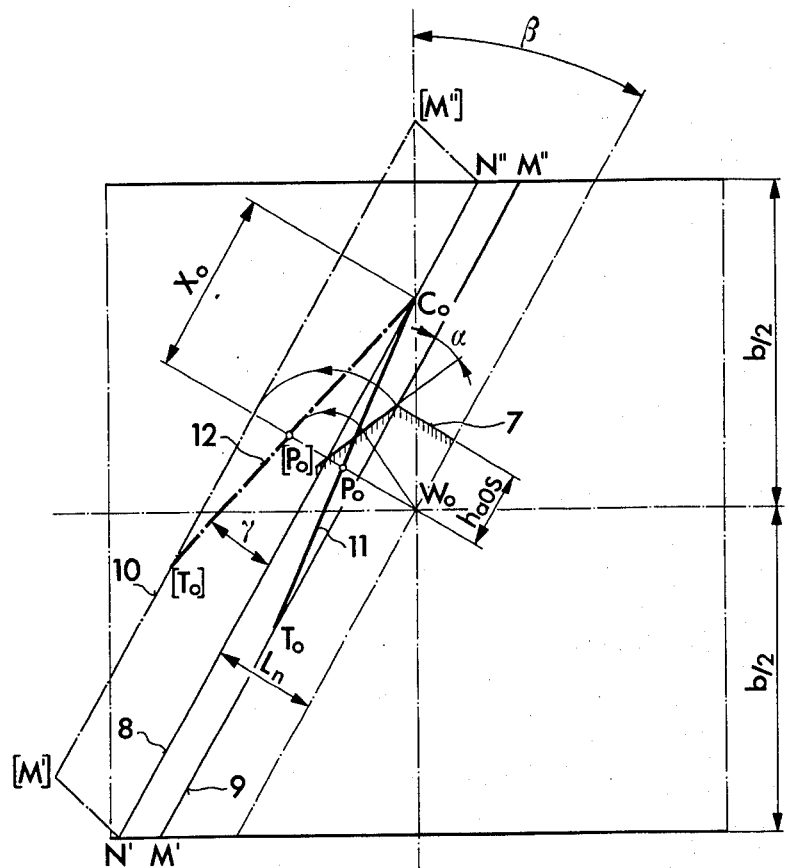
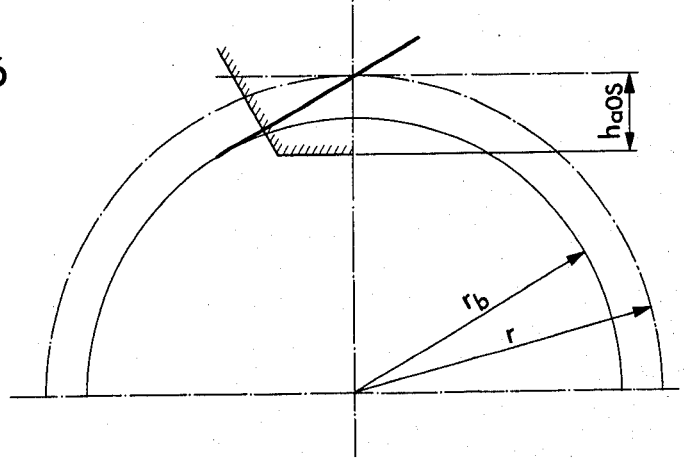
Fig. 6

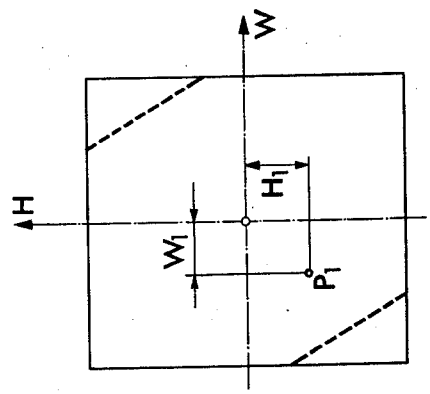
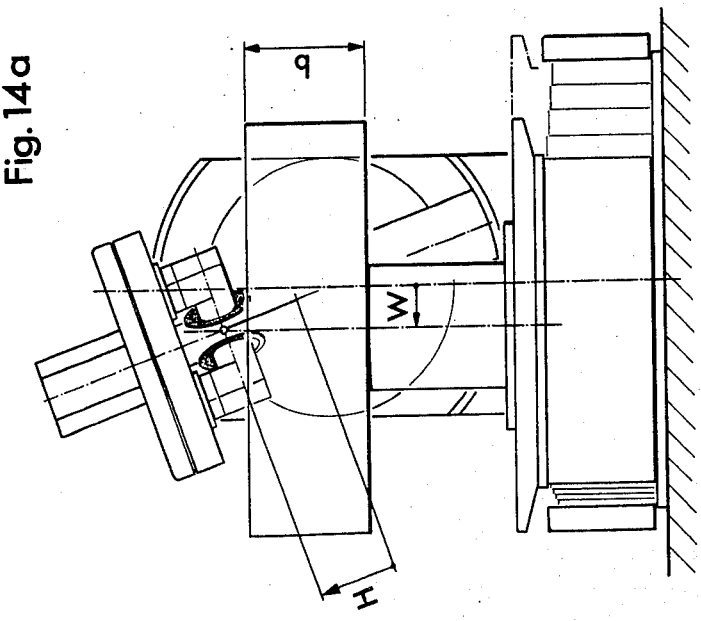

GENERATING METHOD FOR THE CHIP-PRODUCING MACHINING OF INVOLUTE TOOTH FLANKS WITH PROFILE AND LONGITUDINAL CORRECTIONS

BACKGROUND OF THE INVENTION

The present invention relates to a new and improved generating method for chip-producing machining of involute-shaped tooth flanks with profile and longitudinal corrections upon a machine containing one or two tools, constructed to possess a dish, cone or double-cone configuration, which are moved to-and-fro in a stroke-like fashion along the tooth flanks and can be advanced in the direction of the tooth flanks and act at one or two work locations upon a respective tooth flank.

Involute-shaped tooth flanks were heretofore ground either by means of profiled form grinding wheels in an individual generating method, by means of plate or cone-shaped grinding wheels in an indexing generating method, or by grinding worms in a continuous method. Analogous methods can also be accomplished with appropriately configured milling devices.

In U.S. Pat. No. 3,044,221, granted July 17, 1962 and the essentially corresponding German Pat. No. 1,230,650 there is disclosed a horizontal-axis gear grinding machine which works with two plate-shaped or dished grinding wheels and enables the grinding of profile and longitudinal corrections. The generation of the involutes is accomplished by a generating or roll motion about the base circle of the teeth (MAAG-0°-method).

When processing larger workpiece dimensions, there are useful tooth flank-grinding machines having a vertical axis of the workpiece. These tooth flank grinding machines either work with a cone-shaped grinding wheel, for instance as disclosed in German Pat. No. 1,552,792, German Pat. No. 2,029,359 and the corresponding British Pat. No. 1,290,121, published Sept. 29, 1972, or by means of two plate-shaped or dished grinding wheels (MAAG-15°/20°-method), as disclosed for instance in U.S. Pat. No. 3,753,319, granted Aug. 21, 1973 and the essentially corresponding Swiss Pat. No. 529,604 and German Pat. No. 2,050,946.

With grinding machines equipped with conical grinding wheels or disks a grinding support performs an oscillating movement in the tooth direction upon a rotatable part which can be set to the desired helix angle. The workpiece is attached to a circular table and is rolled at the reference profile formed by the conical grinding wheel, with the result that there is produced the desired involute shape. Profile corrections (tip or root relief) are accomplished by a special profiling of the conical-shaped grinding wheel, and longitudinal corrections are produced by radially feeding the grinding wheel towards the workpiece. Significant in this respect is the brochure of the well-known German company Dr. Ing. Höfler Maschinen- und Messgerätebau, entitled "Höfler Zahnrad-Schleiffmaschinen H 500 to H 1000".

When grinding according to the 15°/20°-method with two plate-shaped or dished grinding wheels the reference profile of the teeth is represented by the planes determined by the edges of the grinding wheels (MAAG-Taschenbuch, page 258). A ram or plunger containing two grinding supports is movable to-and-fro at a rotatable part which can be adjusted to the desired helix angle. Just as was the case with the grinding method using conical disks, here also the workpiece is moved with a generating motion past the grinding wheels for the purpose of producing the involute shape. However, the engagement or contact relationships are somewhat more complex than with the conical disk or wheel. Each of both plate-shaped grinding wheels contacts the teeth which are to be ground at the generating straight lines in two grinding zones. These grinding zones are moved over the involute surfaces both by virtue of the generating motion and also because of the stroke movement. A profile correction with this known machine of this design is only possible by an additional grinding revolution while changing the pressure angle or angle of attack of the grinding wheels. Longitudinal corrections are practically not possible.

SUMMARY OF THE INVENTION

Therefore, with the foregoing in mind it is a primary object of the present invention to provide a new and improved generating method for the chip-producing machining of involute-shaped tooth flanks with profile and longitudinal corrections in a manner not associated with the aforementioned drawbacks and limitations of the prior art.

Another and more specific object of the present invention is concerned with improving upon a generating method of the previously described type in a manner such that it can be equally used at machines which work with the 15°/20°-method with a pair of dished grinding wheels or, if desired, milling cutters, and equally at machines having single or double conical-shaped grinding wheels or milling cutters.

Now in order to implement these and still further objects of the invention, which will become more readily apparent as the description proceeds, the inventive method is manifested by the features that there are predetermined the displacements of the or each tool necessary for producing the profile and longitudinal corrections for each work position ($S_a$ and $S_i$, coordinates $g_a$, $h_a$, $g_i$, $h_i$) in the field of action or engagement zone of the teeth and such is controlled as a function of the generating position and the stroke position of the machine tool according to the following equations:

$$S_i: g_a = Q_4 \cdot \sin \beta_b - g^*$$

$$h_a = h^* + Q_4 \cdot \cos \beta_b$$

$$S_i: g_i = g^* + Q_3 \cdot \sin \beta_b$$

$$h_i = h^* - Q_3 \cdot \cos \beta_b$$

wherein, $$g^* = L_n \cdot \frac{\cos\beta \cdot \cos\alpha}{\cos\gamma} + W \cdot \frac{\cos\alpha}{\cos\gamma} - H \cdot \frac{\sin\beta \cdot \cos\alpha}{\cos\gamma}$$

$$h^* = L_n \cdot \sin\beta \cdot \cos^2\alpha - W \cdot \sin^2\alpha \cdot \tan\beta +$$

$$H \left[ \cos\beta + \frac{\sin^2\alpha \cdot \sin^2\beta}{\cos\beta} \right]$$

$$Q_4 = \sqrt{R_s^2 - \left( R_s - \frac{h_{aas}}{\cos\alpha} + y \right)^2 \cdot \cos^2\gamma} +$$

-continued $$\left(R_s - \frac{h_{aos}}{\cos\alpha} + y\right) \cdot \sin\gamma$$

$R_S$ = Radius of the circular-shaped tool edge $$y = \left(\frac{L_n}{\tan\beta} + \frac{W}{\sin\beta} - H\right) \tan\gamma$$

$$Q_3 = \sqrt{R_s^2 - \left(R_s - \frac{h_{aos}}{\cos\alpha} + y\right)^2 \cdot \cos^2\gamma} -$$

$$\left(R_s - \frac{h_{aos}}{\cos\alpha} + y\right) \cdot \sin\gamma$$

wherein,
H = tool stroke
$L_n$ = half tooth gap width
W = generating path
$h_{aos}$ = addendum of the tool
$\alpha$ = pressure angle
$\beta$ = tooth helix angle
$\gamma$ = angle between flank contact- and base or root line.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 1 to 9 illustrate the geometric basis and principles of the inventive method;

FIGS. 14a and 14b illustrate the coordinate system of the grinding machine of FIG. 10.

DETAILED DESCRIPTION OF THE PREFERRED EMBODIMENTS

Figure 1:
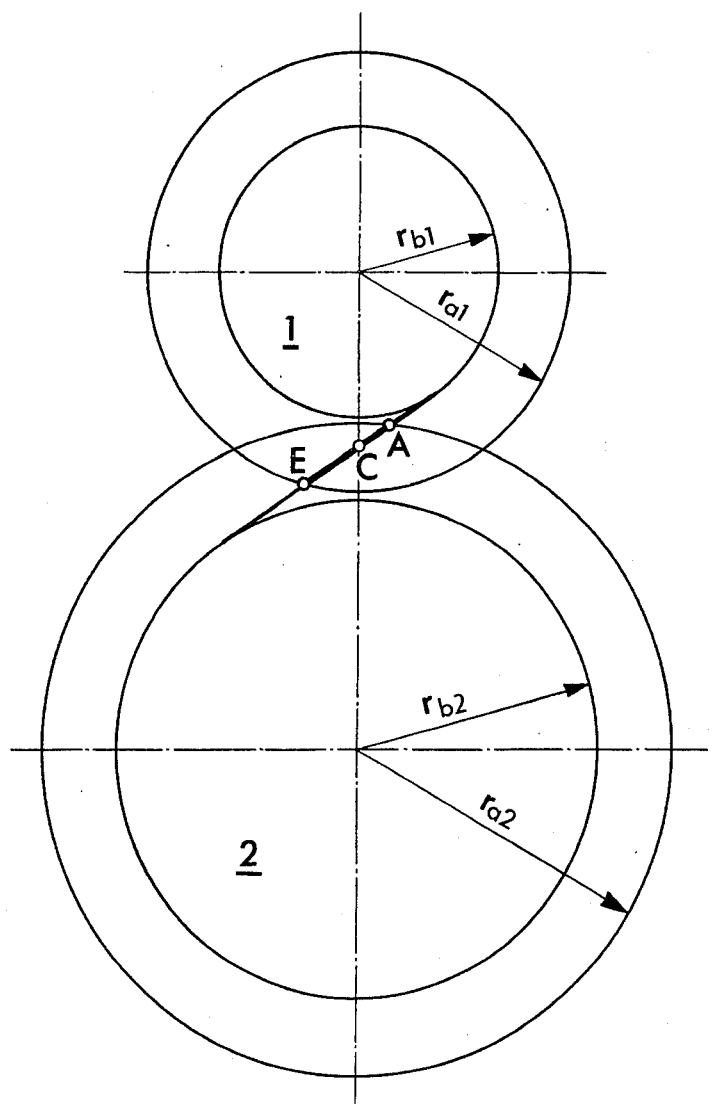

Describing now the drawings, it is here first of all indicated that the significance of the characters and symbols used in the drawings have been listed at the end of this specification in the annexed character and symbol list.

Figure 2:
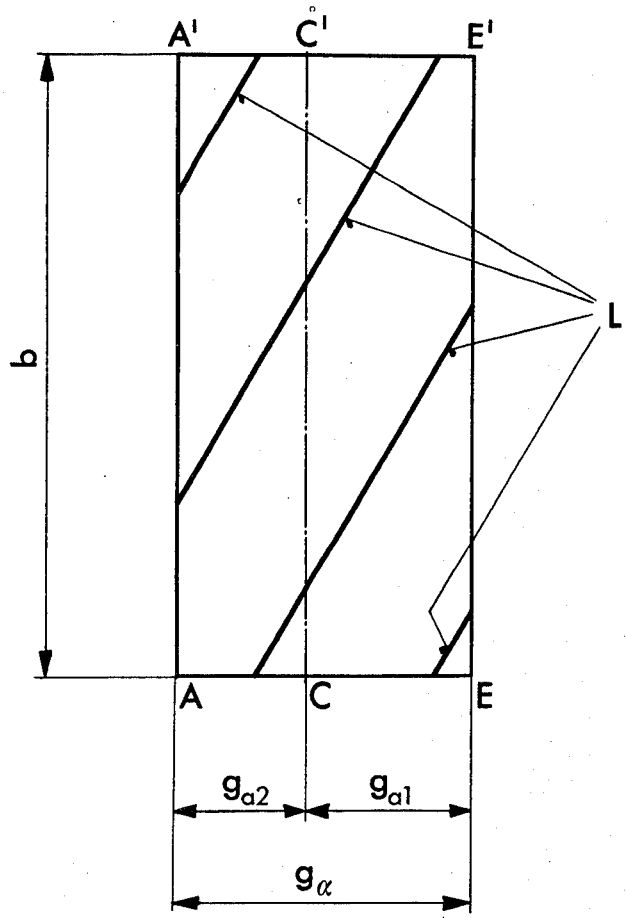

During engagement of the pinion 1 with the gear 2 the contact lines L of the tooth flanks move in a plane of action or an engagement plane AEE'A' (FIG. 2), which appears in the end view of FIG. 1 as the action or engagement path AE and is located in the plane of the drawing of FIG. 2. During the determination of profile and longitudinal corrections at the tooth flanks in the description to follow there is started from such engagement or action plane.

The correction value or magnitude at the points of the field of action or engagement zone can be considered as a topographical distribution over the field of action. Associated with each point of such field of action is basically a correction value which also can amount to null.

Figure 3:
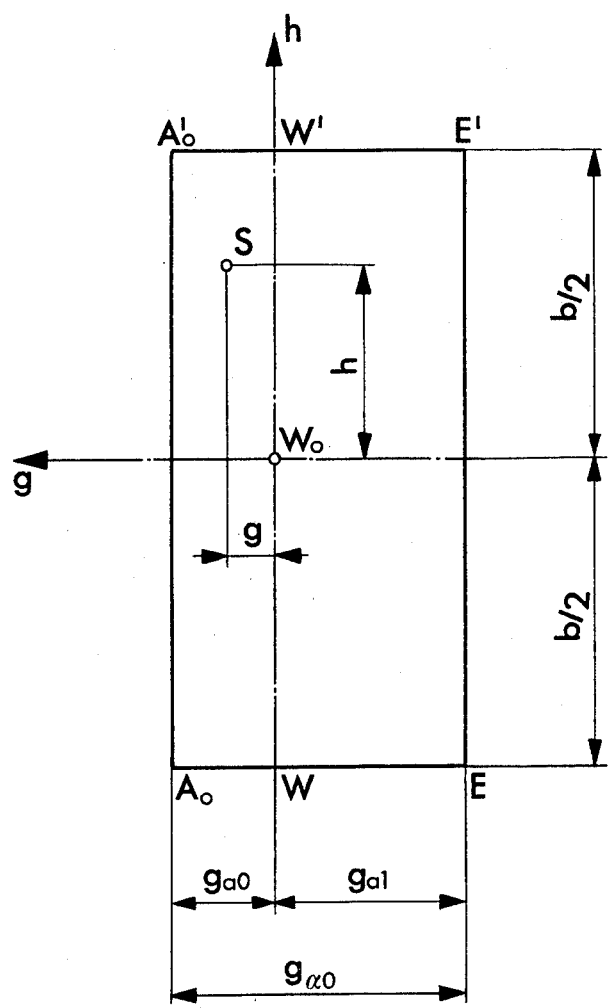

At the generating-engagement or action plane $A_o$-$EE'A'_o$ the coordinate-null point is placed at one-half of the facewidth b/2 at the rolling-generating axis at the point $W_o$ (FIG. 3). The paths of contact or engagement paths $g_{ao}$ and $g_{a1}$ of the tool rack at the pinion 1 is computed in accordance with the well known equations regarding the involute geometry. For practical reasons the generating-engagement field is somewhat wider than the gear pair-engagement field $g_{ao} > g_a$. The length EE' provides the coincidence. The position of a grinding point is indicated by the coordinates g and h.

The generation of an involute surface according to the generating method is predicated, in known manner, upon a tool-standard basic rack tooth profile, which is spatially constituted by a tool-basic tooth rack, at the pitch plane of which there rolls the workpiece. Since chip-producing gear cutting machines, especially gear grinding machines, as a general rule possess two working surfaces which are divided at two tools, especially grinding wheels, or can be united in one tool, it is possible to differentiate two active flanks at the tool-basic tooth rack.

Figure 4:
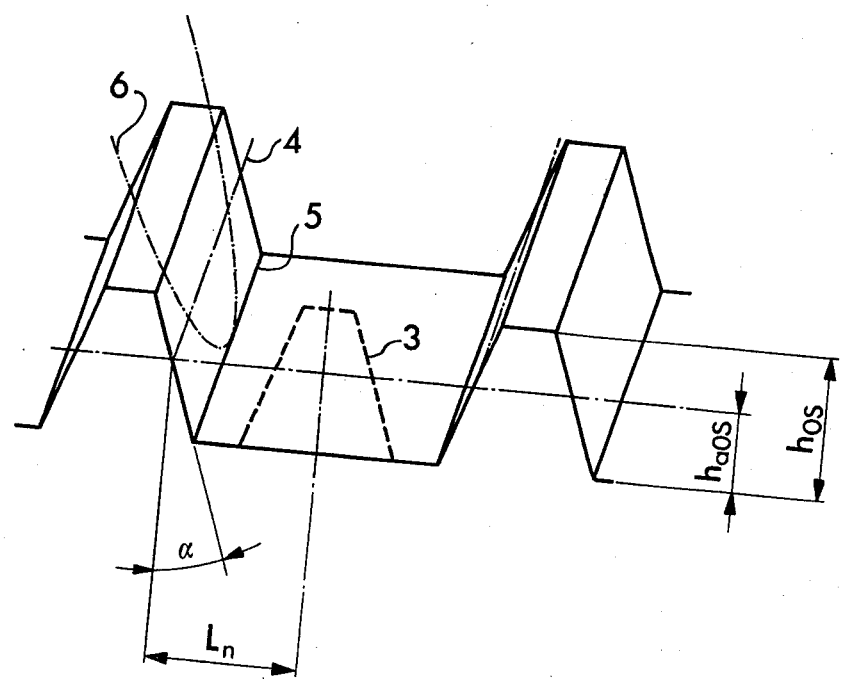

FIG. 4 basically shows the gear basic rack profile 3 in normal section, from which there can be derived as the tooth gap profile the tool-tooth rack profile (machining in two tooth slots or gaps). The tool-tooth rack flank, which is disposed perpendicular to the tool-tooth rack profile, encompasses a pitch line 4 and a base or root line 5, and additionally the edge of a machining tool 6, especially a grinding wheel. The tool-tooth rack profile is determined by the following magnitudes:

$\alpha$ = pressure angle
$L_n$ = half the tooth gap width between the tooth flanks participating in grinding
$h_{aos}$ = tool addendum height or tool addendum (with reference to the grinding of the teeth)
$h_{os}$ = tool tooth depth or height (with reference to the grinding of the teeth).

The computations given hereinafter presuppose that two grinding wheels are machining two tooth gaps or slots of a helical spur gear; the computations are only carried out for one of the grinding wheels, since the relationships for the other grinding wheel as well as also for the other direction or hand of the helical teeth are obtained by appropriately changing the sign.

Figure 5:
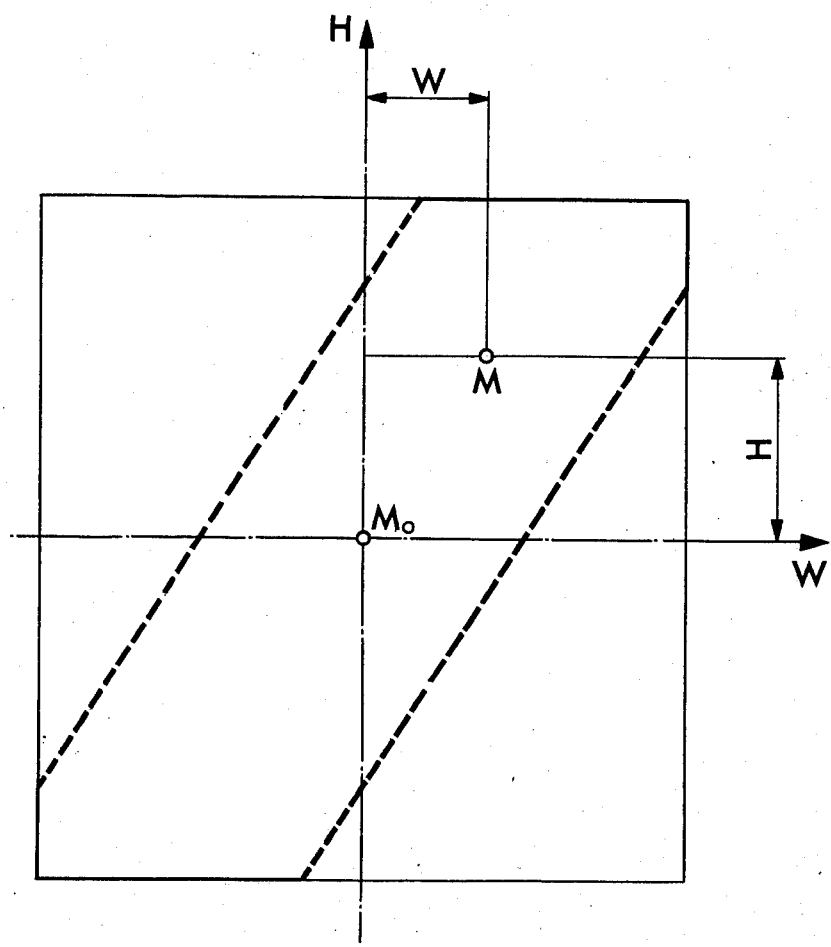

At the gear grinding machine there is selected, according to the showing of FIG. 5, the coordinate-null point in relation to the grinding stroke H and the generating path W, while taking into account the computed symmetry, in such a manner that the symmetry point $M_o$ of both grinding wheels at the center of the gear width and with such grinding stroke position falls at the center of the total generating path of both grinding wheels. Based upon this position there is computed the grinding stroke upwardly with positive sign and downwardly with negative sign, the generating path towards the right with a positive sign and towards the left with a negative sign.

In FIG. 6 there has been illustrated in elevational view the one flank of the tool-basic rack with the outline N'N"M"M'. This flank is not located in such plane of the drawing. It has been flipped-over in the plane of the drawing and then has the outline or contour N'N"[M"][M']. The orientation point $P_o$ for the grinding wheel at this flank, in the null position of the grinding stroke and generating path, is the base or root point of the normal of the generating point $W_o$ upon the tool-rack flank. At a random generating and grinding stroke position the orientation point $P_o$ becomes the point P, which is subsequently determined. The center of the arcuate-circular edge of the dished grinding wheel is located upon the perpendicular from the orientation point P to the base or root line. The grinding edge always contacts this base line.

The tool-basic rack tooth profile has been designated in such FIG. 6 by reference character 7 and the pitch or reference line of the tool-rack flank by reference character 8. The base line of the tool-rack flank has been designated by reference character 9 and its flipping-over or reversal by reference character 10. The flank-contact line between the rack flank and the gear flank has been designated by reference character 11 and the related reversal or flipping-over by reference character 12.

The contact lines between the flank of the tool-basic rack and the tooth flank basically pass through the orientation point P in each generating position. At the generating-null position and during the grinding stroke value-null the flank contact line $T_oC_o$ passes through the point $P_o$ and extends, in the elevational view, from $C_o$ to $T_o$. In the flipped-over or reversed position it is the point $[P_o]$ and the flank contact line extends from $C_o$ towards $[T_o]$.

The angle between the flank contact line and the base or root line amounts to $\gamma$, wherein:

$$\tan\gamma = \sin\alpha \cdot \tan\beta \tag{1}$$

$$x_o = \frac{L_n}{\tan\beta} \tag{2}$$

$$\sin\beta_b = \sin\beta \cdot \cos\alpha \tag{3}$$

Position of the Orientation Point for the Generating Path Value W and the Grinding Stroke Value H When the gear rolls towards the right through the generating path W and the grinding stroke proceeds upwardly by the value H, then the orientation point of the grinding wheel in the flipped-over or reversed position of the tool-reference or basic rack flank shifts from $[P_o]$ towards $[P]$. According to FIG. 7:

$$Q_1 = x_o + \frac{W}{\sin\beta} \tag{4}$$

$$z = Q_1 - H = x_o + \frac{W}{\sin\beta} - H \tag{5}$$

$$y = (Q_1 - H)\tan\gamma = \left(x_o + \frac{W}{\sin\beta} - H\right)\tan\gamma \tag{6}$$

Coordinates of the Orientation Point S* in the Field of Action According to FIG. 3

Figure 7:
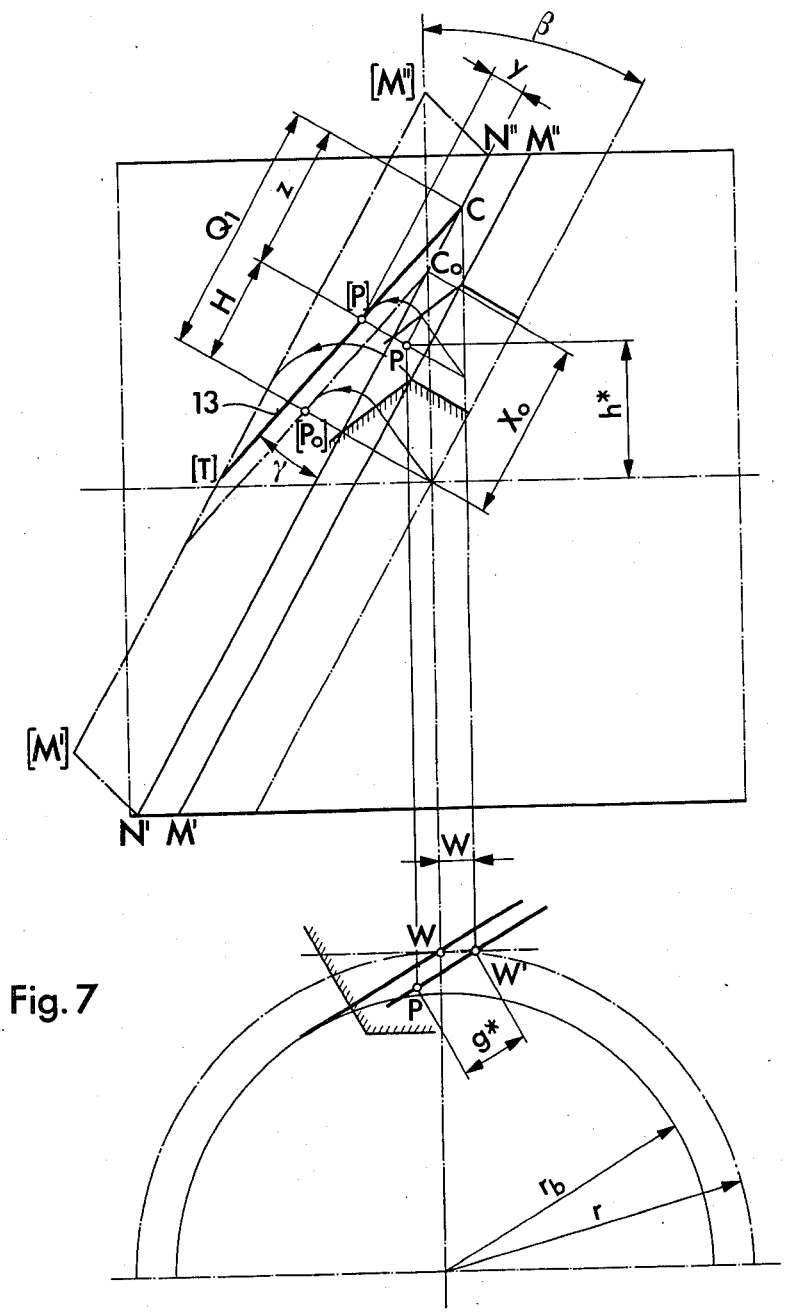

From FIG. 7 and with reference to the fact that the flank contact line constitutes a generatrix of the involute surface, it is possible to derive the coordinates g* and h* of the orientation point of the grinding wheel in the field of action or engagement field.

$$g^* = \frac{z}{\cos\gamma} \cdot \sin\beta_b \tag{7}$$

$$h^* = \frac{L_n}{\sin\beta} + \frac{W}{\tan\beta} - z \cdot \cos\beta - y \cdot \sin\alpha \cdot \sin\beta \tag{8}$$

-continued $$g^* = L_n \cdot \frac{\cos\beta \cdot \cos\alpha}{\cos\gamma} + W \cdot \frac{\cos\alpha}{\cos\gamma} - H \cdot \frac{\sin\beta \cdot \cos\alpha}{\cos\gamma} \tag{11}$$

$$h^* = L_n \cdot \sin\beta \cdot \cos^2\alpha - W \cdot \sin^2\alpha \cdot \tan\beta + \tag{12}$$

$$H\left[\cos\beta + \frac{\sin^2\alpha \cdot \sin^2\beta}{\cos\beta}\right]$$

Figure 8:
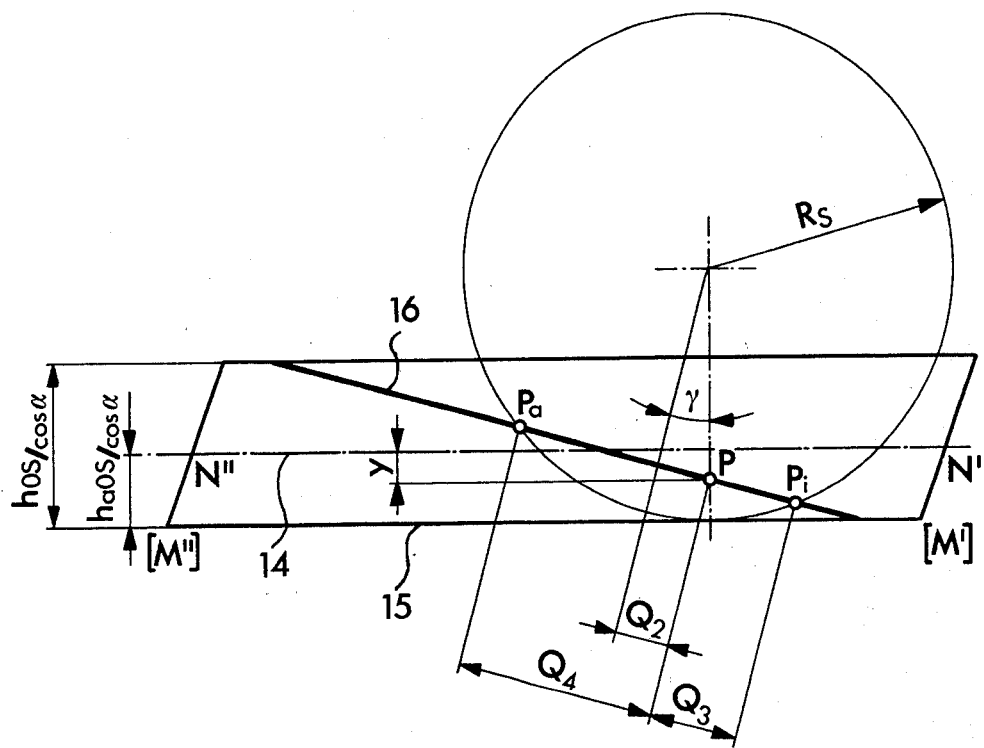

The effective grinding points $P_a$ and $P_i$ have been shown in FIG. 8 at the tool-reference or basic tooth rack flank.

In the plane of the drawing there has been illustrated the tool-basic rack flank. By means of the orientation point P there is determined the position of the flank contact line and the position of the grinding wheel edge. As will be recognized, there are determined by such grinding wheel edge two grinding points upon the flank contact line, an outer grinding point $P_a$ and an inner grinding point $P_i$.

Thus, the spacing of the outer grinding point $P_a$ from the orientation point P is located at the flank contact line $Q_4$.

The spacing of the inner grinding point $P_i$, in turn, from the orientation point P is located at the flank contact line $Q_3$.

$$Q_4 = \sqrt{R_s^2 - \left(R_s - \frac{h_{aos}}{\cos\alpha} + y\right)^2 \cdot \cos^2\gamma} + \tag{13}$$

$$\left(R_s - \frac{h_{aos}}{\cos\alpha} + y\right) \cdot \sin\gamma$$

wherein,
$R_s$ = radius of the circular-shaped tool edge $$y = \left(\frac{L_n}{\tan\beta} + \frac{W}{\sin\beta} - H\right)\tan\gamma$$

$$Q_3 = \sqrt{R_s^2 - \left(R_s - \frac{h_{aos}}{\cos\alpha} + y\right)^2 \cdot \cos^2\gamma} - \tag{14}$$

$$\left(R_s - \frac{h_{aos}}{\cos\alpha} + y\right) \cdot \sin\gamma$$

In FIG. 8 there is illustrated the grinding wheel edge, as explained above, at the outline of the tool-reference rack flank. Reference numeral 14 designates the pitch line and reference numeral 15 the base or root line, whereas reference numeral 16 designates the flank contact line. The radius of the grinding wheel edge of the plate-shaped grinding wheel has been designated by reference character $R_s$, the outer grinding point by reference character $P_a$ and the inner grinding point by reference character $P_i$.

The determination of the position of the grinding points at the field of action or engagement field is undertaken in the following manner: Since spatially the flank contact line coincides with a generatrix of the involute surface, it is possible to determine the position of the grinding points $S_a$ and $S_i$ by reference to the orientation point S* according to FIG. 9. The coordinates of both grinding points in the engagement field are:

$$S_a: g_a = Q_4 \cdot \sin \beta_b - g^* \tag{15}$$

$$h_a = h^* + Q_4 \cdot \cos \beta_b \tag{16}$$

$$S_i: g_i = g^* + Q_3 \cdot \sin \beta_b \tag{17}$$

$$h_i = h^* - Q_3 \cdot \sin \beta_b \tag{18}$$

During the dynamic course of the grinding operation there are continuously present generating path values W and grinding stroke values H for the electronic data processing-evaluation, from which there can be obtained pairs of coordinate values g and h for both of the grinding points $S_a$ and $S_i$ in the case of plate-shaped or dished grinding wheels. As a function of the correction instructions which are likewise associated with the field of action or engagement field there is accomplished an electronic data processing-decision process, which determines whether and which correction value or magnitude should be carried out over the grinding wheel axis. As a rule, there is then accomplished a correction when only one grinding point, and specifically the trailing grinding point in the sense of passing through the field of action or engagement field, becomes effective. Since, theoretically, each grinding point for all of the field of action points moves past, there is ensured for the correction possibility.

When grinding with cone-shaped grinding wheels the grinding point—based upon this geometric consideration—coincides with the orientation point P, i.e. the values $Q_3$ and $Q_4$ are equal to null.

Figure 9:
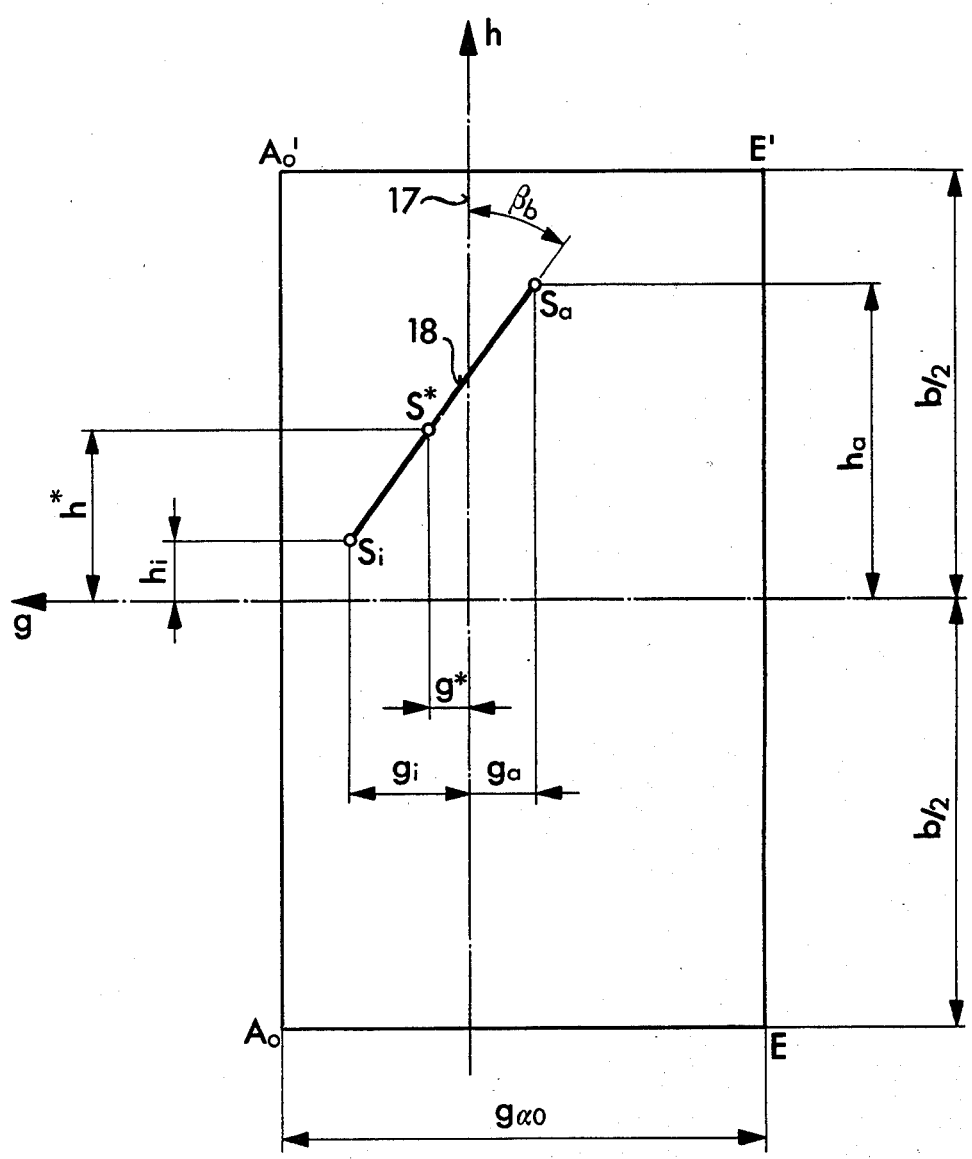

In FIG. 9 there have been plotted both of the active grinding points $S_a$ and $S_i$ in the generating field of action, and there also have been illustrated the flank contact line 18 with the tool rack flank and the generating straight line 17.

Figure 15:
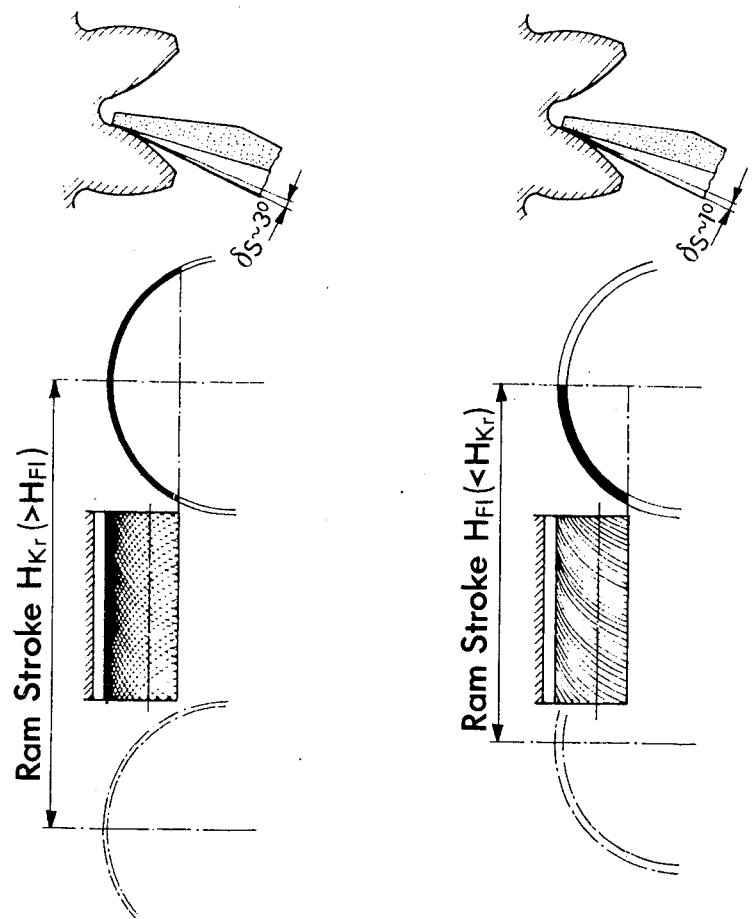
FIG. 15 illustrates an example of a tool working with surface engagement or attack.

A variant of the grinding method, as such is predicated upon these geometric considerations, is constituted by the so-called surface grinding method (see also FIG. 15). Here there are only effective or working the front grinding wheel edges which by pivoting the grinding wheels can be placed somewhat closer to the tooth flanks than the rear edges.

Figure 10:
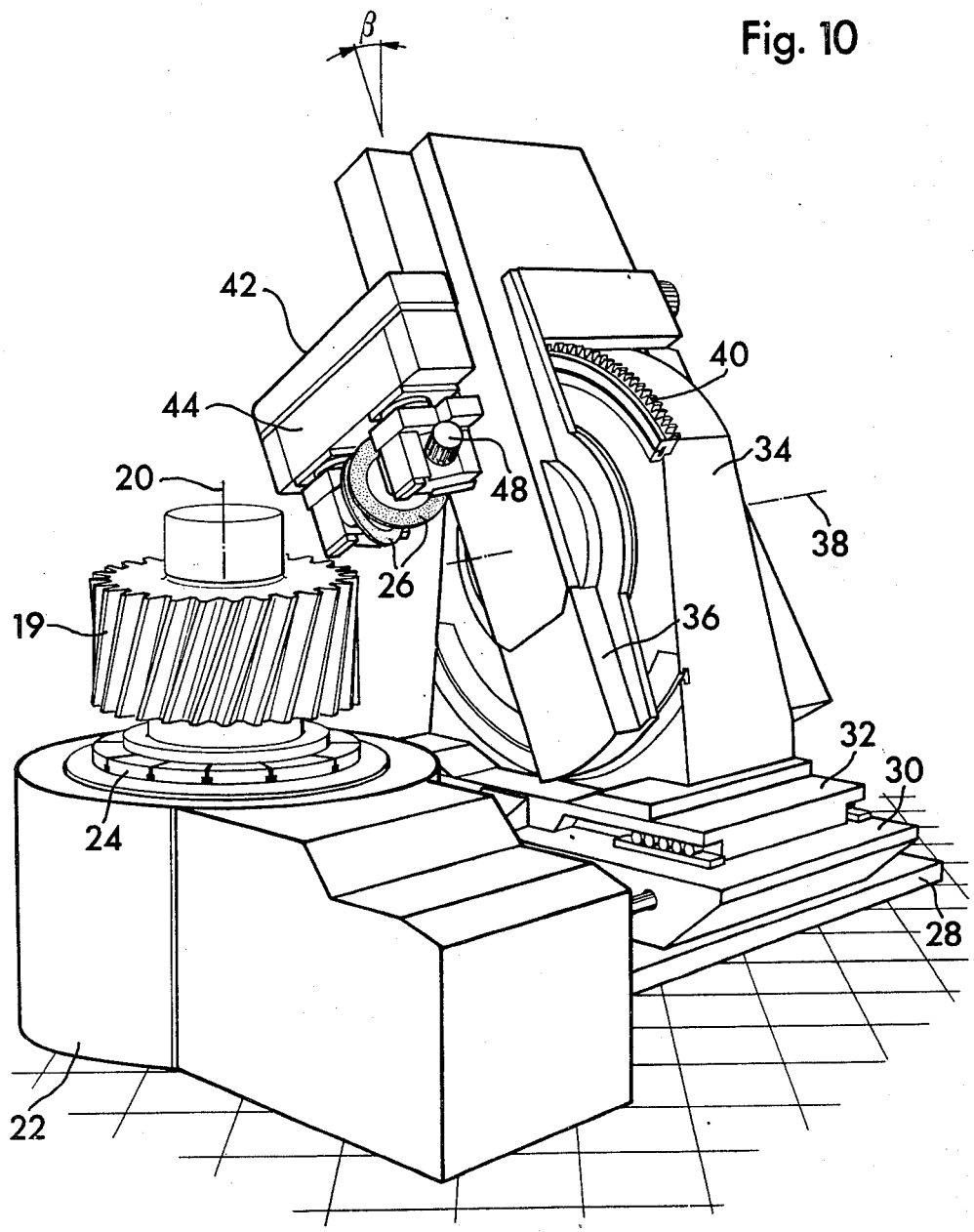
FIG. 10 is a perspective view of a tooth flank-grinding machine for performing the inventive method.

The gear grinding machine depicted in FIG. 10 is structured for grinding the tooth flanks of a helical gearwheel or gear 19, whose axis 20 is essentially vertically arranged. Belonging to the gear grinding machine is a socket or base member 22 in which there is rotatably drivingly mounted a circular table 24 for rotational movement about the vertical axis 20. The gear or gearwheel 19 is chucked upon the circular table 24 and exclusively carries out the rotational movements needed for the indexing generating grinding, namely the roll or generating rotations, at which follows in each case an indexing rotation after grinding two tooth flanks. All of the remaining movements, namely the up-and-down directed stroke movements along the tooth flanks of the gear 19, as well as the linear movements tangential to the gear 19 and belonging to the rolling or generating operation, in other words transversely to its axis, and the correction movements are performed by two grinding wheels 26 which, in the illustrated exemplary embodiment, are adjusted or set for performing the MAAG 15°/20°-method. The gear grinding machine possesses the following components needed for the required movements of both grinding wheels 26:

Adjustably guided radially with respect to the gear or gearwheel 19 upon a machine bed 28 is a bed slide or carriage 30. Guided to be displaceable tangentially with respect to the gear 19 upon the bed slide or carriage 30 is an upright slide or carriage 32, in order to impart to the grinding wheels 26 the linear to-and-fro components of the generating movement. Upon the upright carriage or slide 32 there is attached a stand or upright 34 at which there is mounted to be pivotably adjustable a pivotable guide or guide means 36 about a horizontal axis 38 extending perpendicular to the gear or gearwheel 19. In order to pivot and fix the pivotal guide or guide means 36 there is arranged at the stand 34 an externally toothed ring segment 40. As best seen by referring to FIG. 10, the pivotal guide 36 is inclined with respect to the vertical through the helix angle $\beta$ of the teeth of the gear or gearwheel 19.

Movable up-and-down in a stroke-like fashion along the pivotal guide or guide means 36 is a transverse guide or guide means 42. At the transverse guide 42 there is guided a transverse carriage or slide 44 which carries two grinding wheel supports 46, as best seen by referring to FIG. 11. At each grinding wheel support, or briefly grinding support 46, there is mounted to be rotatably driven one of the grinding wheels 26. A drive motor 48 for the right-hand located grinding wheel 26 shown in FIGS. 10 and 11 is clearly recognizable in the illustration of FIG. 10.

Figure 11:
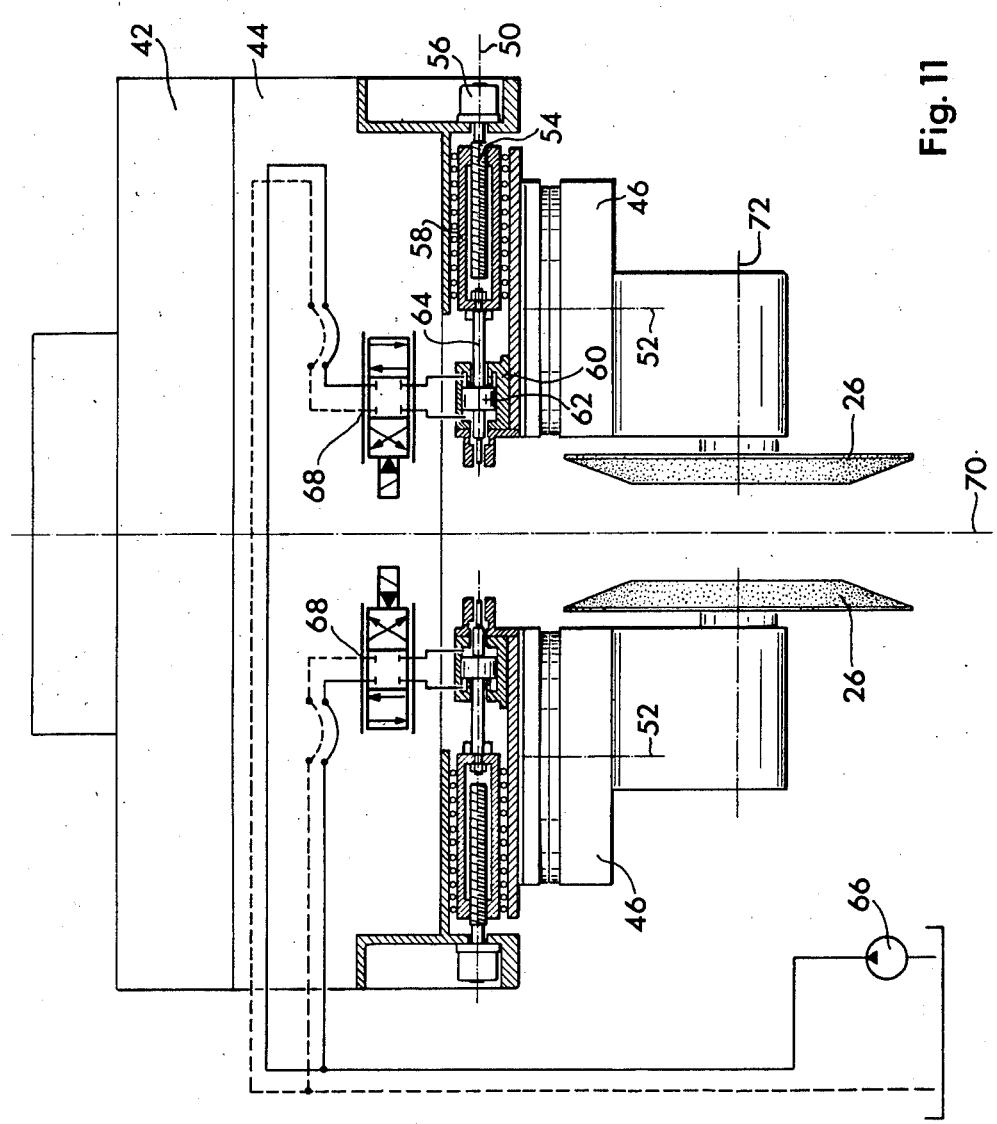
FIG. 11 is a front view of a portion of the grinding machine, partially in vertical sectional view.

As best seen by referring to FIG. 11, each of the grinding wheel supports 46 is displaceable in relation to the transverse carriage or slide 44 in the direction of the axis 50 of a related threaded spindle 54. Additionally, both of the grinding wheel supports 46 are angularly adjustable for accommodating different pressure angles about a respective axis 52 extending parallel to the pivotal guide 36.

A threaded spindle 54 is operatively associated with each grinding wheel support 46 for displacement along the axis 50 of the related grinding wheel 26. Each threaded spindle 54 is axially non-displaceably mounted in the transverse carriage or slide 44 and can be driven by a drive motor 56. Each of the threaded spindles 44 is threaded into a nut member or part 58 which is displaceably guided parallel to the axis 50 in relation to the related grinding wheel support 46. Secured to each grinding wheel support 46 is a double-acting hydraulic cylinder 60 in which operates a related piston member 62. The axis of the cylinder 60 is aligned with that of the related threaded spindle 54. The piston or piston member 62 is connected with the nut member 58 by means of a piston rod 64.

Both of the cylinders 60 are supplied with oil or any other suitable pressurized fluid medium from a common pump 66 by means of a respective multi-position, here a three-position control or slide valve 68. In the portrayed intermediate position of such control valves 68 there are disconnected in each of both cylinders 60 the cylinder chambers formed at both sides or faces of the related piston member 62 from the direct connection with the pump 66.

Reference numeral 70 designates the symmetry axis for both grinding wheel supports 46. A variant of the depicted arrangement contemplates displacing the grinding wheels 26 in relation to their grinding wheel spindle axes 72.

With the illustrated arrangement, both of the grinding wheels 26 are effective at their essentially planar marginal or edge surfaces facing away from one another. Each of both grinding wheels 26 has imparted thereto the usual advance or feed movements from the related drive motor 56 by means of the spindle 54, the nut member 58, the piston rod 64 and the cylinder 60 without the piston member 62 moving within its related cylinder. On the other hand, the correction movements needed for the profile and/or longitudinal corrections are imparted to each grinding wheel 26 in that, the related cylinder 60 is supplied with oil at one or the other face of its piston member 62.

Figure 12:
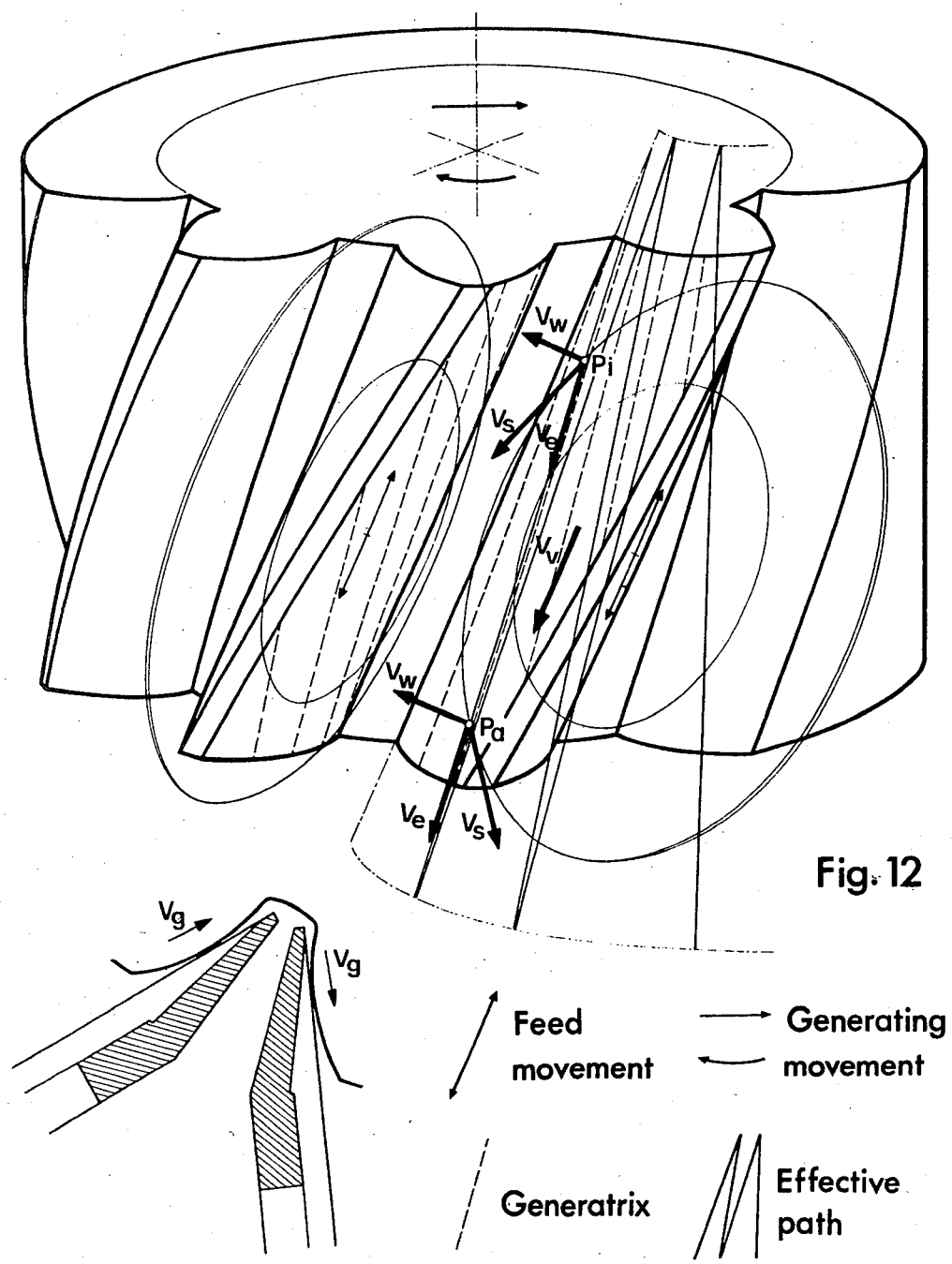
FIG. 12 illustrates the kinematics of a tool arranged at the grinding machine of FIG. 10.

During the performance of the 15°/20°-method of MAAG, as likewise previously explained, the engagement conditions or interaction between the grinding wheel and the tooth flank are very complex. Therefore, these conditions have been particularly illustrated in FIG. 12.

The generating movement is divided into a rotational component and a translatory component. The rotation is governed by an indexing gear having a worm, the translation by the module spindle (see also FIG. 10). Both drives are connected by means of change gears in order to reduce the desired module and the desired tooth number. The grinding feed is accomplished by means of a ram or plunger which moves up-and-down in a rotational component. This rotational component or part is appropriately inclined with respect to the helix angle which is to be ground.

Without any generating movement the effective or operative paths of the geometric grinding points coincide with the generatrix, and it is to be observed that the dished or plate-shaped grinding wheels always contact the generatrix at two points.

With the ram movement discontinued, however with the generating operation still effective or turned-on, the geometric grinding points shift along the outer edge of the dished grinding wheels.

During the 15°/20°-grinding method of MAAG, the position of the geometric grinding points, in the transverse section (along the involute) and in the section of the tooth flank with a cylinder (along the flank line) coaxial to the gear body, are determined according to the invention both by the generating motion and also at the same time by the stroke motion.

Figure 13:
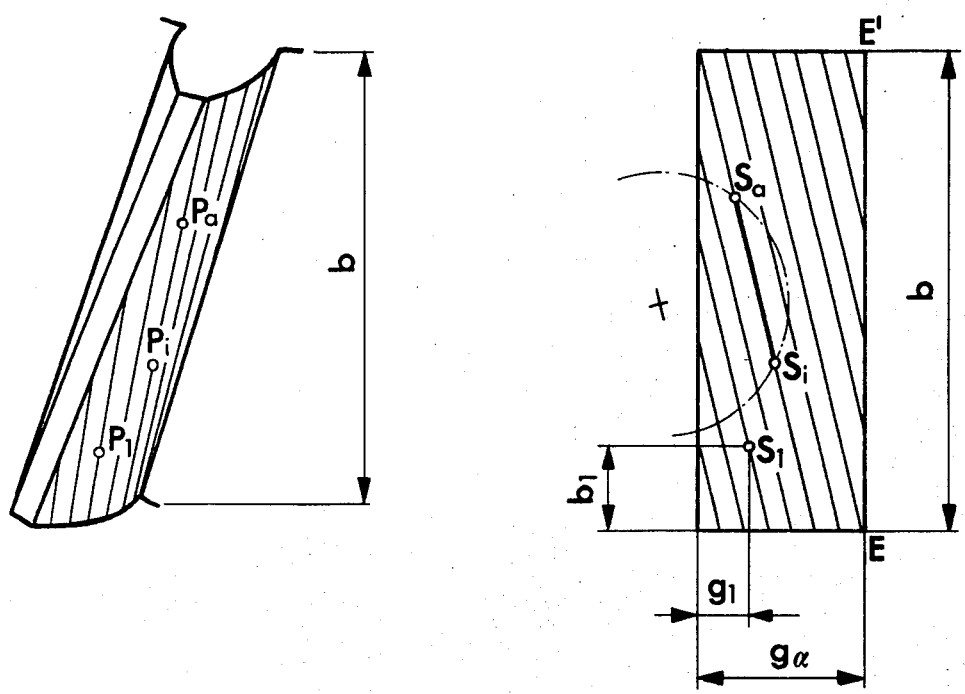
FIG. 13 is an engagement zone or field of action diagram.

As previously explained in detail, there are defined the geometric grinding points in the field of action or engagement field diagram (see FIG. 13), i.e. in the coordinate system gear facewidth b/engagement path $g_\alpha$ (generating path or roll angle) and, on the other hand, in the coordinate system of the grinding machine formed by the grinding stroke position H and the generating path position W. There has been illustrated at the left of such field of action or engagement field diagram a tooth flank where there have been indicated the generatrix and both of the geometric grinding points $P_a$ and $P_i$, where the grinding wheel contacts the involute flanks at a predetermined grinding stroke position and in a predetermined generating path position. At the right-hand portion of the showing there has been depicted the same illustration, however in a rectangular coordinate system $g_\alpha/b$.

FIGS. 14a and 14b illustrate the same relationships in the coordinate system of the grinding machine generating path W/grinding stroke H (FIG. 14a). Between both coordinate systems $g_\alpha/b$ and W/H there prevail unambiguous geometric relationships.

What is important is that both the value $b_1$ and also the value $g_1$ of a point $P_i$ in the field of action or engagement field diagram are simultaneously dependent upon the values $W_1$ and $H_1$ in the machine coordinate field.

As recognized by inspecting FIG. 15, during surface grinding, grinding with "half of the chord", there is only a single geometric grinding point, something which basically simplifies somewhat the mathematical analysis. On the other hand, with surface grinding there is present an unambiguous correlation of the reference point in the engagement field or field of action to the operating or work point at the tooth flank.

At this point there will now be enumerated in detail hereinafter the character and symbol list mentioned at the outset of this disclosure:

CHARACTER AND SYMBOL LIST $b$ = facewidth of the gear 2 and 19, respectively, to be machined $b_1$ = distance of a random grinding point $S_1$ at the engagement field with respect to the lower end face through the point E $g$ = coordinate axis for the engagement path of a random grinding point S from the generating point measured towards the tooth root $g_1$ = tooth root engagement path of a random grinding point $S_1$ in the engagement field or field of action $g_a$ = addendum engagement path of an outer grinding point $S_a$ in the engagement field $g_{a0}$ = addendum engagement path of the tool-reference or basic rack with respect to the generating-roll axis WW' in the generating engagement field $g_{a1}$ = addendum engagement path of the pinion 1

$g_{a2}$ = addendum engagement path of the gear 2 or 29, respectively $g_i$ = dedendum or base or root engagement path of an inner grinding point $S_i$ in the engagement field $g^*$ = coordinate of the orientation point of the grinding wheel in the engagement field $g_\alpha$ = total engagement path $g_{\alpha 0}$ = total engagement path in the generating-engagement field $h$ = spacing of a random grinding point S from the coordinate axis g through $W_0$ $h_a$ = spacing of an outer grinding point S - in the engagement field - from the coordinate axis g $h_{aOS}$ = tooth addendum height of a tool $h_{OS}$ = active tool tooth addendum with respect to the grinding of the teeth $h_i$ = spacing of an inner grinding point $S_i$ - in the engagement field - from the coordinate axis g $h^*$ = spacing of an orientation point $S^*$ of the grinding wheel in the engagement field from the coordinate axis g $r$ = pitch or reference circle radius of the gear 2 or 19, respectively $r_{a1}$ = addendum circle radius of the pinion 1

$r_{a2}$ = addendum circle radius of the gear 2 or 19, respectively $r_b$ = base circle radius of the gear $r_{b1}$ = base circle radius of the pinion 1

$r_{b2}$ = base circle radius of the pinion 2

$v_e$ = velocity of the grinding point in the direction of the flank contact line $v_g$ = relative velocity of the grinding point at the tooth flank $v_s$ = velocity of the grinding wheel edge $v_y$ = stroke velocity $v_w$ = velocity of the grinding point perpendicular to the flank contact line $y$ = spacing of the orientation point p from the reference line N'N" at the tool gear rack flank $z$ = projection of the path P C at the reference line N'N"

$\alpha$ = pressure angle $\beta$ = tooth helix angle $\beta_b$ = base helix angle $\gamma$ = angle between flank contact line and base line $\delta_s$ = rear rotational angle of the grinding wheel $A$ = tooth addendum point of the gear at the engagement

CHARACTER AND SYMBOL LIST

- A' = corresponding point to A at the oppositely situated end plane path
- $A_O$ = tooth addendum point of the tool-reference or basic gear rack at the engagement path
- $A_O'$ = corresponding point to $A_O$ at the oppositely situated end plane
- C = generating or roll point at the engagement path
- C = intersection point of the flank contact line with the reference line N'N" for a random generating point W (FIG. 7)
- C' = corresponding point to C at the oppositely situated end plane
- $C_O$ = intersection point of the flank contact line with the reference line N'N" for the generating path W = null
- E = tooth addendum point of the pinion at the engagement path
- E' = corresponding point to E at the oppositely situated end plane
- H = tool stroke
- H' = tool stroke at a certain point in time
- $H_{Fl}$ = tool stroke during surface grinding
- $H_{Kr}$ = tool stroke during cross-grinding
- L = flank contact line between tool flank and gear
- $L_n$ = half tooth gap width
- M = reference point for the grinding wheel at the generating path W-grinding stroke H-diagram
- M' = intersection point of the base line of the tool reference gear rack flank with the lower end surface - in elevation
- M" = intersection point of the base line of the tool reference gear rack flank with the upper end surface - in elevation
- $M_O$ = symmetry point
- [M'] = flipping-over or reversal of M' in the elevational plane
- [M"] = flipping-over or reversal of M" in the elevational plane
- N' = intersection point of the reference line of the tool reference gear rack flank with the lower end surface
- N" = intersection point of the reference line of the tool reference gear rack flank with the upper end surface
- P = orientation point for the grinding wheel edge at the tool reference gear rack flank in random generating and grinding stroke position
- $P_O$ = orientation point for the grinding wheel edge in the null position of the generating path and grinding stroke
- $P_1$ = random point at the generatrix of the tooth flank
- $P_a$ = effective grinding point - outside -
- $P_i$ = effective grinding point - inside -
- $Q_1$ = auxiliary magnitude in FIG. 7
- $Q_2$ = difference between $Q_3$ and $Q_4$
- $Q_3$ = partial spacing at the grinding chord from the orientation point P to the inner intersection point $P_i$ of the grinding wheel edge
- $Q_4$ = partial spacing at the grinding chord of the orientation point P to the outer intersection point $P_a$ of the grinding wheel edge
- $R_S$ = radius of the circular tool edge
- S = random grinding point at the generating-engagement field
- $S_1$ = random grinding point in the engagement field or field of action
- $S_a$ = outer grinding point in the engagement field
- $S_i$ = inner grinding point in the engagement field
- S* = orientation point for the grinding wheel edge in the generating engagement field
- [T] = intersection point of the flank contact line with the tooth base line of the tool gear rack flank for a random generating path W - in the flipped-over or reversed position -
- $T_O$ = intersection point of the flank contact line with the tooth base line at the tool gear rack flank for the generating path W = null
- W = generating path; intersection point of the generating roll axis in the engagement field with the lower end surface
- W' = intersection point of the generating roll axis in the engagement field with the upper end surface
- $W_O$ = coordinate-null point for g- and h- coordinate axes
- $W_1$ = generating or roll path at a predetermined point in time
- $X_O$ = projection of the path $[P_O]$ $C_O$ for the generating path W = null upon the reference line N'N".

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. A generating method for the chip-producing machining of involute-shaped tooth flanks using a machine tool containing one or two tools in a 15°/20° configuration each constructed as a dished, cone or double-cone shaped tool, said method comprising the steps of:

moving each said tool to-and-fro in a stroke-like fashion along the tooth flanks in an engagement field defined at the related tooth while feeding each said tool in the direction of the tooth flanks so as to act upon a respective tooth flank at one or two work positions;

predetermining the displacement of each said tool for generating profile and longitudinal corrections for each work position ($S_a$ and $S_i$, coordinates $g_a$, $h_a$, $g_i$, $h_i$) in said engagement field; and controlling the displacement of each said tool for generating the profile and longitudinal corrections at each said work position as a function of the generating position and the stroke position of each said tool according to the following equations:

$$S_a \cdot g_a = Q_4 \cdot \sin \beta_b - g^*$$

$$h_a = h^* + Q_4 \cdot \cos \beta_b$$

$$S_i \cdot g_i = g^* + Q_3 \cdot \sin \beta_b$$

$$h_i = h^* - Q_3 \cdot \cos \beta_b$$

wherein:

$$g^* = L_n \cdot \frac{\cos\beta \cdot \cos\alpha}{\cos\gamma} + W \cdot \frac{\cos\alpha}{\cos\gamma} - H \cdot \frac{\sin\beta \cdot \cos\alpha}{\cos\gamma}$$

$$h^* = L_n \cdot \sin\beta \cdot \cos^2\alpha - W \cdot \sin^2\alpha \cdot \tan\beta + H\left[\cos\beta + \frac{\sin^2\alpha \cdot \sin^2\beta}{\cos\beta}\right]$$

$$Q_4 = \sqrt{R_s^2 - \left(R_s - \frac{h_{aos}}{\cos\alpha} + y\right)^2 \cdot \cos^2\gamma} + \left(R_s - \frac{h_{aos}}{\cos\alpha} + y\right) \cdot \sin\gamma$$

$$y = \left(\frac{L_n}{\tan\beta} + \frac{W}{\sin\beta} - H\right) \tan\gamma$$

-continued $$Q_3 = \sqrt{R_s^2 - \left(R_s - \frac{h_{aos}}{\cos\alpha} + y\right)^2 \cdot \cos^2\gamma} + \left(R_s - \frac{h_{aos}}{\cos\alpha} + y\right) \cdot \sin\gamma$$

H = tool stroke
$L_n$ = half tooth gap width
$Q_3$ = partial spacing at the grinding chord from the orientation point P to the inner intersection point $P_i$ of the grinding wheel edge
$Q_4$ = partial spacing at the grinding chord from the orientation point P to the outer intersection point $P_a$ of the grinding wheel edge
$R_S$ = radius of the circular-shaped tool edge
W = generating path
$h_{aos}$ = tooth addendum height of the tool
y = spacing of the orientation point P from the reference line N'N'' at the tool gear rack flank
$\alpha$ = angle of attack
$\beta$ = tooth helix angle
$\beta_b$ = base helix angle
$\beta$ = angle between flank contact line and base line 2. The method as defined in claim 1, further including the step of:
displacing each said tool for accomplishing said profile and/or longitudinal corrections in a substantially horizontal plane perpendicular to a generating direction.

3. The method as defined in claim 1, further including the step of:
displacing each said tool for accomplishing said profile and/or longitudinal corrections essentially perpendicular to the stroke direction and in a vertical plane essentially parallel to a generating direction.

4. The method as defined in claim 1, further including the step of:
undertaking the displacement of each said tool for the profile and/or longitudinal corrections in the direction of the axis of a grinding spindle.

5. The method as defined in claim 1, further including the steps of:
operating each said tool in surface engagement with a related tooth flank; and
engaging only one of both work positions ($S_a$ or $S_i$).

* * * * *